Jan. 7, 1941.  H. SEEGERS  2,227,514
GAUGE
Filed Oct. 17, 1938
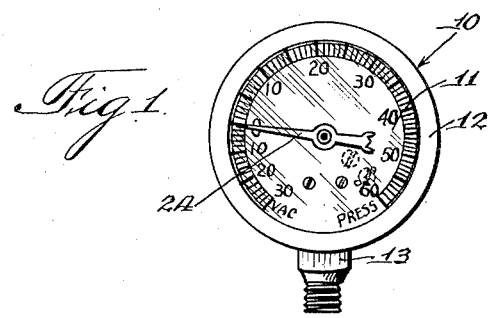
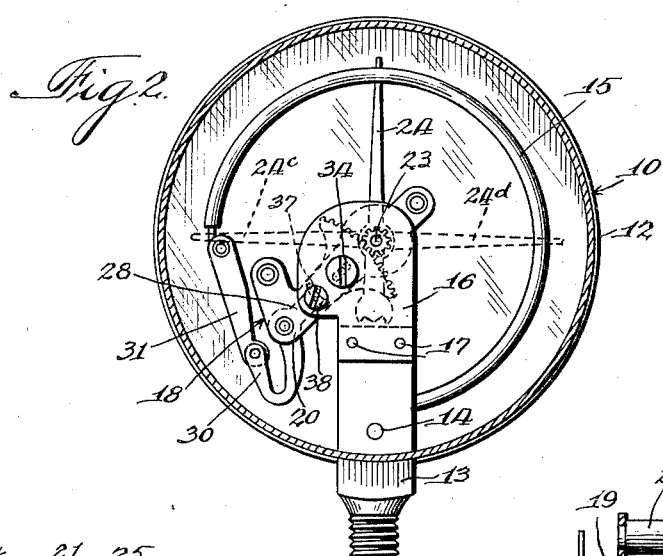
Inventor
Hans Seegers
By Ames, Thiess, Olson & Mecklenburger
Attys.

Patented Jan. 7, 1941

2,227,514

UNITED STATES PATENT OFFICE 2,227,514

GAUGE

Hans Seegers, Chicago, Ill., assignor to Jas. P. Marsh Corporation, Chicago, Ill., a corporation of Illinois Application October 17, 1938, Serial No. 235,355

1 Claim. (Cl. 73—109)

This invention relates to gauges and has special reference to so-called "zero adjustment gauges" in which the indicator actuated by a vacuum or a pressure responsive element or other suitable mechanism may be readily and conveniently adjusted to a "zero" position upon the graduated dial of the gauge, with such adjustment being positively maintained.

More particularly, this invention relates to a gauge comprising a supporting member and an adjustable frame member mounted on the supporting member, there being an indicator journaled in the said frame and a transmission mechanism between an actuator and the indicator with the transmission mechanism being mounted in the said frame member. An adjusting means is engaged between the supporting member and the frame member for adjusting the relative positions thereof, and means are carried by one of the members for engaging the other of the members for releasably but positively holding the frame member in a desired adjusted position.

The present invention is particularly adapted for use in connection with substantially all types of pressure or vacuum gauges and dial thermometers. While the present construction has substantial universal application, it is shown as being embodied in a pressure gauge of the type shown in the patent to Hans Seegers No. 2,100,754, issued November 30, 1937, and reissued August 16, 1938, as Reissue Patent No. 20,830.

In the type of pressure gauge therein shown a rotatable adjusting member is mounted on a support and has an eccentric portion co-operating with the pivotally mounted frame to move the frame and thereby adjust the pointer by a rotary movement of the adjusting member. It is possible in such construction, should excessive pressures prevail in the line to the actuator, or should abusive treatment be received by the gauge in handling, shipping, or the like, or should more than the usual or continuous use occasion wear in the operating frictional parts, that the rotatable adjusting member may slip from its adjusted position. Such accidental movement of the rotatable adjusting member is at least not desired, and the present invention has for one of its objects the provision of means carried by the frame member and the supporting member for releasably but positively holding the members in a desired adjusted position relative to each other.

One of the objects of this invention is to provide a gauge of the character indicated above which is comparatively inexpensive to manufacture and easy to assemble, and which will not readily get out of order.

Another object of this invention is to provide a gauge of the type noted above, in which means are provided for releasably but positively holding the adjustable frame member and the support therefor in a desired adjusted position relative to each other.

Other objects and advantages of this invention will hereinafter be more particularly pointed out, and for a more complete understanding of the characteristic features of this invention reference may now be had to the following description when taken together with the accompanying drawing, in which latter:

Figure 1 is a front elevational view of a gauge embodying the features of this invention, having a graduated dial, and being provided with means whereby an adjustment of the indicator and a fixed positioning of such adjustment may be accomplished from outside the casing;

Fig. 2 is a rear elevational view partially in section of the construction illustrated in Fig. 1;

Fig. 3 is an enlarged front elevational view of the operating mechanism illustrated in Fig. 2, with a portion of the adjustable transmission frame thereof broken away for purposes of illustration; and Fig. 4 is a sectional view through the adjustable transmission mechanism taken on the line 4—4 of Fig. 3.

Referring now more particularly to the drawing, the construction shown as embodying the features of this invention comprises a gauge having a casing 10 and a transparent cover 11 which is retained in position by means of a retaining ring 12. The ring is arranged to telescope the casing 10 and is retained in position by any suitable means.

A tubular fitting 13 extends through an opening in the bottom of the casing 10 and is secured therein by means of a screw 14 passing through the rear of the casing and engaging a threaded aperture in the fitting 13. The fitting 13 has the usual passage therein communicating with a Bourdon expansible and contractible tube 15 such as is commonly used in pressure gauges and which is secured in any suitable manner to the fitting whereby the tube is in communication with the passage through the fitting.

An indicator operating mechanism, which will hereinafter be more particularly described, is connected to the free end of of the Bourdon tube 15 and is mounted on a support 16, which is in turn rigidly secured to the fitting 13 by any suitable means, such as screws 17. The indicator operating mechanism comprises a shiftable frame 18, which in the embodiment illustrated comprises two spaced, parallel side plates 19 and 20 that are permanently secured together by suitable spacing posts 21 and 22.

An indicator shaft 23 is rotatably mounted in the frame 18 by being journaled in the plates 19 and 20, and extends outwardly to support an indicating hand 24. The shaft 23 is provided with the usual hairspring 25 secured thereto and to the frame 18, all in the well-known manner, as is indicated in Fig. 3. The indicator 24 plays over a graduated dial shown in Fig. 1.

The shaft 23 is also provided with a pinion 26 fixed thereon, the pinion co-operating with a gear segment 27 formed integrally on a lever 28, which latter is pivotally mounted on the post 29 in the frame 18. The lever 28 is provided with an integrally-formed gooseneck arm 30, or other well-known adjustment means, that is flexibly connected to the Bourdon tube 15 by means of a link 31, as shown in Figs. 2 and 3.

The frame 18, comprising the front plate 19 and the rear plate 20, together with the associated indicator operating mechanism, is so mounted on the support 16 as to be rotatably adjusted about the fixed axis of the indicator shaft 23. Thus, the position of the indicator 24 may be adjusted in any position, within limits, relative to the graduations formed upon the dial face. In other words, when the frame 18 is rotated with respect to the fixed support 16 about an axis coincident with the axis of rotation of the shaft 23, and since the shaft 23 and indicator 24 are mounted upon the frame 18, the indicator 16 is thus capable of being adjusted with respect to the fixed dial face whereby "zero adjustment" of the gauge may be effected.

The frame 18 is rotatably mounted on the supporting plate 16 in the following manner: As shown in Fig. 4, a spring washer 32 may be interposed between the rear plate 20 of the frame 18 and the fixed support 16, and these members are rotatably secured together by means of an eyelet 33, which later serves to form a bearing for the shaft 23. It will therefore be seen that when the frame 18 and its associated mechanism, including the shaft 23 and the indicator 24, are rotated upon the eyelet 33, the indicator 24 will be moved relative to the Bourdon tube 15. Of course, the spring washer 32 is not necessary in this instant construction.

As shown in Fig. 2, the indicator 24 is operatively connected to the Bourdon tube 15 through the link 31, the gear segment 27, the pinion 26, and the shaft 23, all of which elements, excepting the link 31, being mounted upon the frame 18 to form a unit assembly. When the frame 18 is rotated upon the eyelet 33, the compensating action of the aforesaid assembly of elements will cause the indicator 24 to be rotated to the desired position on the dial without disturbing the normal functioning of the Bourdon tube 15. As a result, the indicator 24 is therefore capable of being adjusted over a wide range by imparting a small rotatable movement to the frame 18.

Rotation of the frame 18 is effected in the following manner: A stud 34, exteriorly accessible at the rear of the gauge casing or, if desired, accessible through an opening in the dial and accessible by removing the transparent cover 2, is frictionally mounted for rotation in the supporting plate 16, and is provided with an inwardly extending pin 35 that is eccentrically mounted on the inner end of the stud 34. This pin extends through an elongated, narrow slot 36 formed in the rear plate 20. The slot 36 is of sufficient length so that the stud 34 may be completely rotated in either direction, whereby the frame 18 is likewise rotated in either direction about its axis which coincides with that of the eyelet 33 and of the indicator shaft 23. Because of the fact that the indicator 24 and the mechanism controlling its operation are mounted upon the frame 18, and since the Bourdon tube 15 is flexibly connected through the link 31 to the gear segment 27, the indicator 24 may thus be rotatably adjusted through a comparatively wide range indicated, for example, by the dotted lines 24c and 24d shown in Fig. 2.

The frame plate members 19 and 20 may be made interchangeable by providing each with a slot 36 to receive the pin 35 so that the support 16 and the adjusting stud 34 may be positioned on either side of the fitting 13 and the same adjustment may be accomplished with equal facility and in the same manner on the front of the gauge by having the stud 34 exteriorly accessible at the front of the gauge as described above and as shown by the dotted lines 34a of Fig. 4. In this embodiment the stud will be in the position indicated in dotted lines 34a in Fig. 4. The pin 35 will extend through a slot in the frame plate 19 corresponding to the slot in the frame plate 20. In this embodiment the stud 34 is within the casing. However, it extends through a suitable opening in the dial and is easily accessible by removing the retaining ring 12 and the transparent cover 11.

It is to be noted in Fig. 2 that the indicator 24, shown in full lines, is not at the zero position indicated on the dial of Fig. 1, but that it is positioned vertically for the purpose of clearly illustrating the range of adjustment that is available. Obviously, this range of adjustment is dependent upon the degree of eccentricity of the pin 35 with respect to the axis of the stud 34. When the mechanism is assembled in a case as illustrated in Fig. 2, the adjusting stud 34 extends through an opening in the back of the case and is exteriorly accessible of the casing, the stud being provided with a slot whereby a screw driver or other like means may be used for adjustment.

The adjusting stud may be completely and continuously rotated in either direction and the indicator 24 will merely oscillate through the range indicated by dotted lines in Fig. 2, it being understood, of course, that the range of adjustment may be within desired limits in accordance with the eccentric position of the pin 35 on the stud 34. By this construction it is impossible to injure the device by continued rotation of the stud, nor can the accuracy of the instrument be impaired.

As above stated, the stud 34 is frictionally mounted for rotation in the supporting plate 16, and it has been found in some instances of use that the friction set up in the mounting of the stud is not sufficient to resist accidental rotation of the stud after adjustment. In order, therefore, to releasably hold the frame in its adjusted positions without accidental misadjustment thereof through a rotation of the stud 34, a slot 37 is formed in the support 16 for receiving the shank of a screw 38 threadedly engaging a threaded aperture in the plate 20 of the frame 18. The slot 37 is preferably arcuate and is described by a radius centered on the pivot of the frame which is the shaft 23. Since the support 16 is shown as being spaced from the plate 20, a washer 39 is disposed in the space therebetween about the shank of the screw 38. The head of the screw frictionally engages the face of the support 16 bounding the slot 37 and frictionally bears thereon as the screw 38 is tightened in the threaded aperture of the side 20 of the frame.

When it is desired to adjust the gauge to zero position upon the graduated dial thereof, the screw 38 is loosened and the stud 34 is rotated so that the eccentric portion thereof cooperates with the frame 18 to move it and thereby adjust the pointer. After adjustment of the pointer to the desired adjusted position, the screw 38 is tightened to set up a frictional resistance which, in addition to the frictional resistance afforded by the adjusting member 34, holds the frame 18 and the support 16 in a desired adjusted position relative to each other. The washer 39 holds the plate 16 in parallel relation to the plate 20 at all times. The screw 38 may be exteriorly accessible of the case in the same manner as is the adjusting stud 34, and, should the adjusting stud 34 be mounted at the front of the gauge in the position shown by dotted lines in Fig. 4, the screw 38 would of course be shifted to a position adjacent thereto for operation in the same manner from the front of the gauge.

While but a single embodiment of this invention is herein shown and described, it is to be understood that various modifications thereof may be apparent to those skilled in the art without departing from the spirit and scope of this invention, and therefore the same is only to be limited by the scope of the prior art and the appended claim.

I claim:

A gauge of the character described which comprises a support, an actuator, a slotted frame pivoted on said support, said support having an arcuate slot described by a radius centered on the pivotal point of said frame and said support, an indicator journaled in said frame, the pivotal axes of said frame and said indicator being substantially coincident, a transmission mechanism pivotally mounted in said frame connecting said actuator and said indicator, a casing having a pair of apertures housing said gauge structure, and separate exteriorly accessible means for setting and positively securing said indicator at a predetermined zero point, said setting means comprising a stud member in frictional rotatable engagement with said support means having an eccentric pin extending into the slot in said frame, whereby adjustment of said stud member rotates said frame, which in turn sets said indicator to a desired zero point, one of said apertures in said casing registering with said stud member providing ready access thereto for effecting ready adjustment, said positive securing means comprising a screw extending through said arcuate slot in said support and threadably engaged with said frame for frictionally but releasably securing said frame in the desired adjusted position in relation to said support effected by said setting means, the other of said apertures in said casing registering with said screw and providing ready access thereto.

HANS SEEGERS.